W. F. DURAND.
PLANIMETER.
APPLICATION FILED APR. 7, 1909.
927,338.
Patented July 6, 1909.
2 SHEETS—SHEET 2.
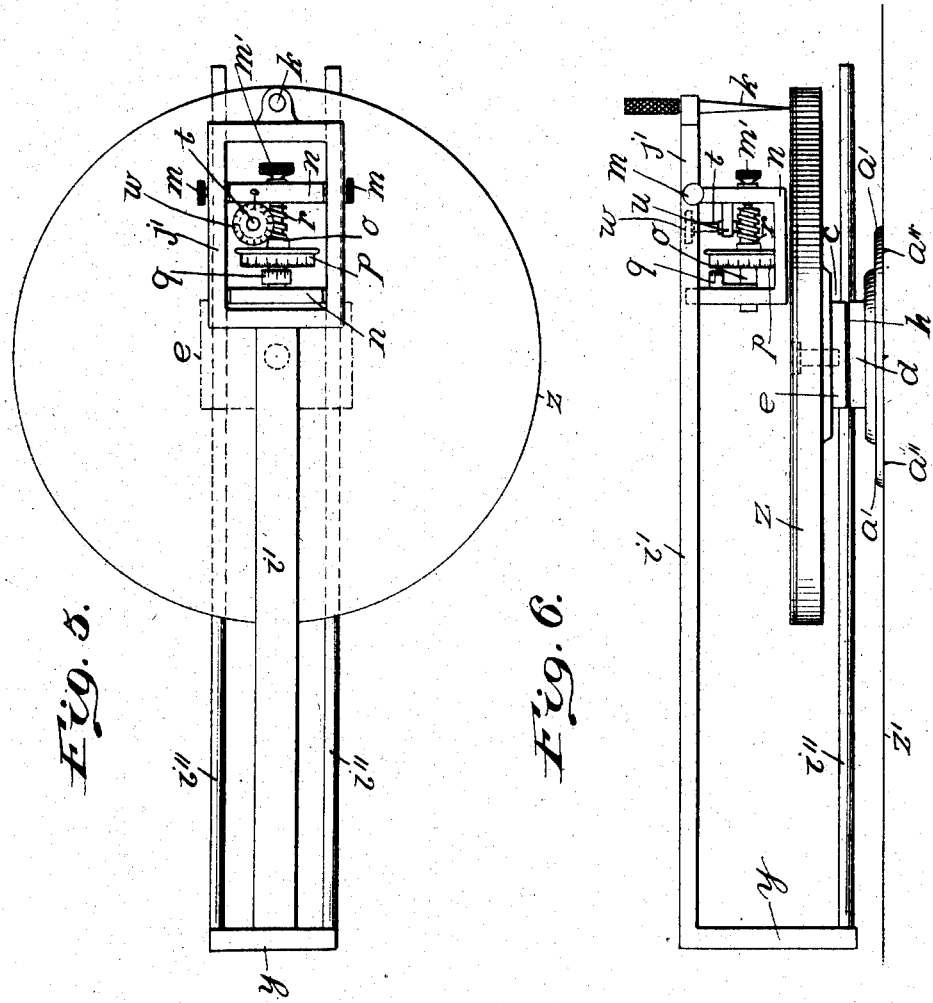
WITNESSES
M. E. Campion
M. Hamilton
INVENTOR
William F. Durand
BY his ATTORNEY
James Hamilton

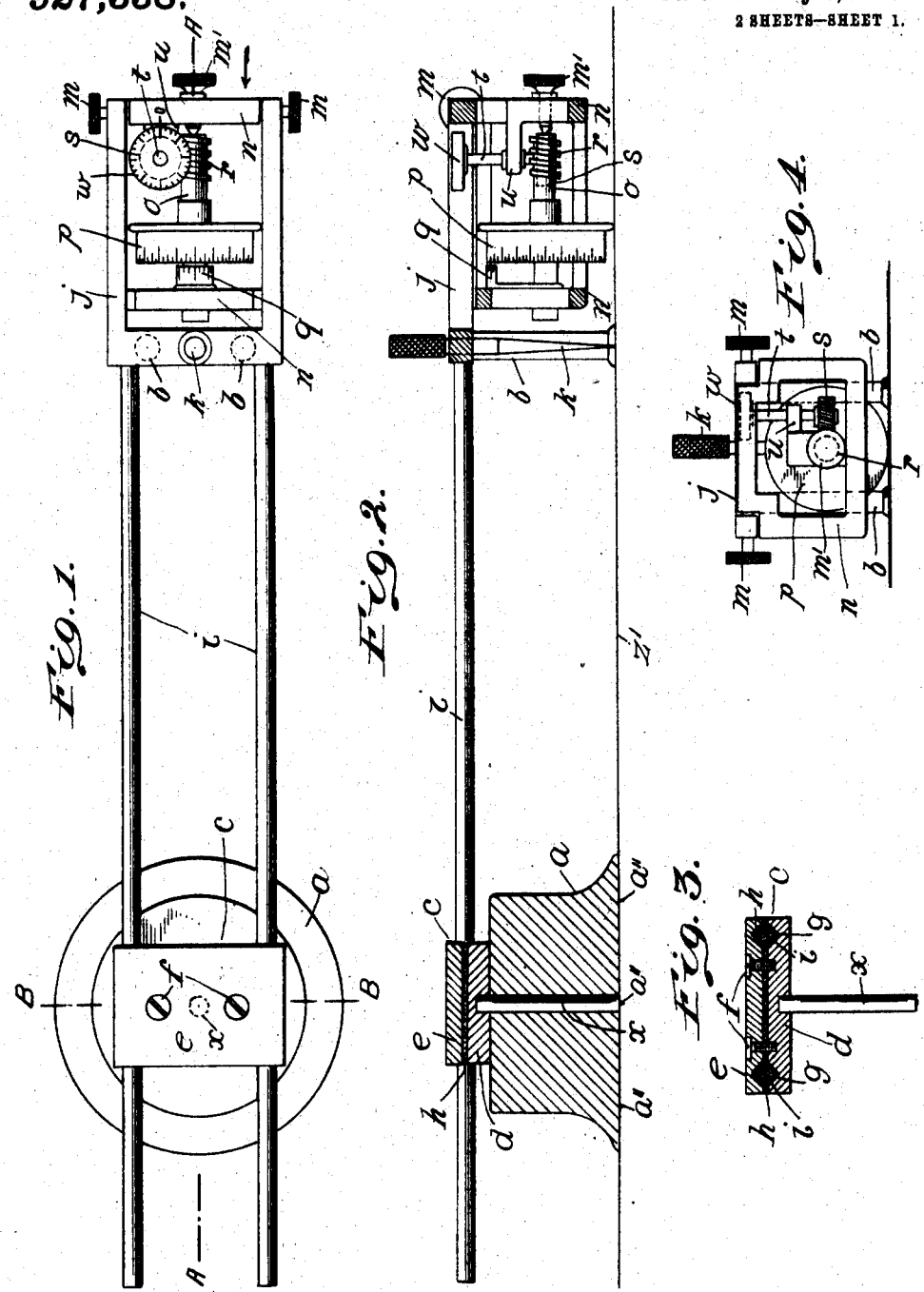

UNITED STATES PATENT OFFICE.

WILLIAM F. DURAND, OF STANFORD UNIVERSITY, CALIFORNIA.

PLANIMETER.

No. 927,338.   Specification of Letters Patent.   Patented July 6, 1909.

Application filed April 7, 1909.  Serial No. 488,374.

*To all whom it may concern:*

Be it known that I, WILLIAM F. DURAND, a citizen of the United States, residing at Stanford University, in the county of Santa Clara and State of California, have invented certain new and useful Improvements in Planimeters, of which the following is a specification, reference being had to the accompanying drawings.

My invention relates to improvements in planimeters; and an object of my invention is to provide a planimeter adapted for use in determining the mean radial ordinate of diagrams plotted in polar coördinates. Dial-recording gage instruments which trace a diagram in polar coördinates but the tracing arm of which follows a curvilinear path have gone into general use for recording various engineering quantities, mechanical, thermal and electrical. It has become desirable to ascertain the mean radial ordinate of such diagrams; and it is an object of my invention to provide an integrating or averaging instrument by means of which this desired quantity may be obtained. My new instrument is adapted, of course, to be used in connection with diagrams plotted by the marking point moving in and out on straight radial lines (such as diagrams of crank-turning effort) as well as in connection with diagrams in which the marking point moves in arcs of circles.

In the drawings illustrating the principle of my invention and the best mode now known to me of applying that principle, Figure 1 is a plan view of my new planimeter; Fig. 2 is a central, longitudinal section on the line A—A of Fig. 1; Fig. 3 is a section on the line B—B of Fig. 1; Fig. 4 is an end view looking in the direction of the arrow of Fig. 1; Fig. 5 is a plan of a modified form; and Fig. 6 is an elevation of the planimeter shown in plan in Fig. 5.

Upon the base-plate $a$ is mounted free to turn the two-part guide-plate $c$ which consists of the bottom-plate $d$ and the top-plate $e$ fastened together by the screws $f$ and each formed with a pair of grooves $g$ lined with cloth $h$. Through the grooves $g$ passes a pair of carrier-rods or guide-bars $i$ which support at one end the tracer-carrying frame $j$ in which is rigidly mounted the tracer $k$. On each side of the latter is a leg or post $b$. Mounted upon the pivot-screws $m$ free to swing in the tracer-carrying frame $j$ is the wheel-frame $n$ in which is mounted free to rotate the wheel-shaft $o$. The outer end of the latter is supported by the pivot-screw $m'$. Upon the wheel-shaft $o$ is rigidly fastened the integrating wheel $p$ and to the inner end of the wheel-frame $n$ and adjacent to the integrating-wheel $p$ is fastened the vernier-plate $q$. Upon the wheel-shaft $o$ is formed a worm $r$ which meshes with a worm-wheel $s$ at the lower end of a vertical shaft $t$ which is journaled in the bracket $u$ carried by the wheel-frame $n$. Upon the upper end of the shaft $t$ is a counter-wheel $w$ which indicates the number of revolutions made by the integrating-wheel $p$. It will be understood that the carrier-bars $i$ are free to slide lengthwise in the cloth-lined grooves $g$ without lost motion; and that the shaft $o$, which carries the integrating-wheel $p$, lies in the same vertical plane with the pivot-post $x$ upon which the guide-plate $c$ turns and which is rigidly connected with the bottom plate $d$.

In the modified form shown in Figs. 5 and 6, the rear end of the carrier-bar $i'$ is joined by the connecting plate $y$ to a pair of guide-bars $i''$ which pass through grooves in a base-block $a'$. Upon the latter is mounted free to rotate a diagram-plate $z$. The tracer $k$ is carried at the outer end of the tracer-frame $j'$. The wheel-frame $n$ and the parts carried by it are substantially the same members illustrated in Figs. 1 and 2. The lower face of each of the base-blocks $a$, $a'$ are formed with pin points $a''$ by which they engage in the surface upon which the instrument is supported.

In Figs. 1 and 2 the diagram-support is the table or board $z'$ upon which the instrument is mounted for the time being.

I claim:

1. A planimeter consisting of the combination of a base; a guiding device mounted free to rotate on said base; a guide-bar mounted free to slide lengthwise in said guiding device; a tracer carried by said guide-bar; and an integrating wheel carried by said guide-bar.

2. A planimeter consisting of the combination of a base; a guiding device mounted free to rotate on said base; a guide-bar mounted free to slide lengthwise in said guiding device; a tracer carried by said guide-bar; a wheel-frame mounted free to swing in said guide-bar; and an integrating wheel carried by said wheel-frame.

3. In a planimeter, the combination of a stationary base; a guide-bar supported thereby free to slide lengthwise; a tracer; and an integrating wheel, said tracer and wheel being carried by said guide-bar.

4. In combination, a stationary base; a guide-bar supported thereby free to slide lengthwise; a tracer; an integrating wheel, the latter and said wheel being carried by said guide-bar; and a diagram-support, said wheel and diagram-support being movable relatively and the friction between them serving to drive said wheel.

In testimony whereof I have hereunto set my hand at said Stanford University, this 30th day of March A. D. 1909, in the presence of the two undersigned witnesses.

WM. F. DURAND.

Witnesses:
F. A. STEVENS,
F. E. CORBALEY.